United States Patent [19]

Voss et al.

[11] 4,040,789
[45] Aug. 9, 1977

[54] USE OF THE CONTINUOUS BLAST FURNACE GAS ANALYSIS FOR SUPERVISION AND REGULATION OF THE BLAST FURNACE OPERATION

[75] Inventors: Eitel Voss; Karl-Heinz Waldöfner, both of Duisburg; Kurt Harz, Moers, all of Germany

[73] Assignee: August Thyssen-Hütte AG, Duisburg-Hamborn, Germany

[21] Appl. No.: 743,831

[22] Filed: Nov. 22, 1976

[30] Foreign Application Priority Data

Nov. 29, 1975 Germany .............................. 2553756

[51] Int. Cl.² ...................... C21B 7/24; G01N 25/18; C21B 5/00
[52] U.S. Cl. ............................ 23/230 A; 23/232 R; 23/232 E; 23/253 A; 23/254 R; 23/254 E; 75/60
[58] Field of Search ........... 23/230 A, 253 A, 232 R, 23/232 E, 254 R, 255 R; 75/60; 73/23

[56] References Cited

U.S. PATENT DOCUMENTS

| 3,432,288 | 3/1969 | Ardito et al. | 23/254 R |
| 3,520,657 | 7/1970 | Frumerman | 23/254 X |
| 3,522,035 | 7/1970 | Putman | 75/60 |
| 3,528,800 | 9/1970 | Blum et al. | 23/230 A |
| 3,997,335 | 12/1976 | Kolb et al. | 75/60 |

Primary Examiner—R.E. Serwin
Attorney, Agent, or Firm—Burgess, Dinklage & Sprung

[57] ABSTRACT

An improvement in the process for regulating the operation of a blast furnace in response to analysis of the effluent blast furnace gas residing in continuously admixing the blast furnace gas with a carrier gas, removing from said admixture CO, $CO_2$ and $H_2$ thereafter feeding the remaining gas admixture comprising carrier gas and $N_2$ into a nitrogen measuring means. Also disclosed is an apparatus therefore, especially one which permits said removal by oxidation of CO and $H_2$ and adsorption of the $CO_2$ and $H_2O$.

24 Claims, 1 Drawing Figure

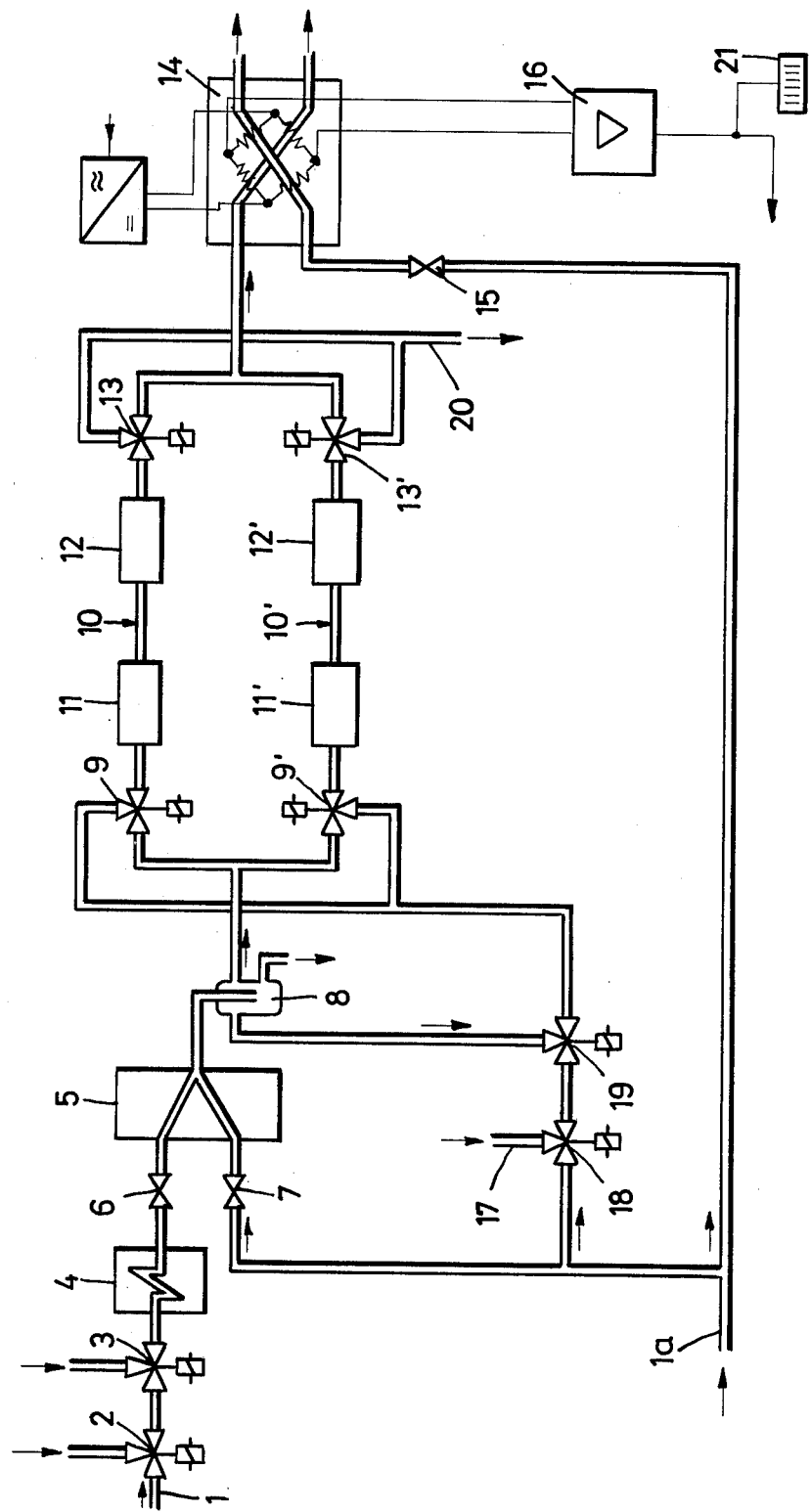

USE OF THE CONTINUOUS BLAST FURNACE GAS ANALYSIS FOR SUPERVISION AND REGULATION OF THE BLAST FURNACE OPERATION

BACKGROUND OF THE INVENTION

1. Field of the Invention

This invention relates to the measurement of the components of a blast furnace effluent gas. More especially, this invention relates to a process for determining the nitrogen content of a blast furnace gas directly whereby supervision and regulation of the blast furnace operation is facilitated, as by means of a process computer for automatic regulation. This invention is particularly concerned with a process and apparatus for the direct determination of the nitrogen content of said gas rather than by determining the quantity of other components in said gas and calculating the nitrogen content by difference.

2. Discussion of the Prior Art

Various mathematical models have been developed in recent years which permit automation of the regulation of the blast furnace operation to such an extent that the operation can be guided with the aid of a computer.

The blast furnace gas analysis in the process models used achieves the function of a command, as the reduction behavior of the furnace can be derived therefrom. The optimal chemical capacity utilization of the reduction gas aims at decreasing the consumption of coke. Besides this ratio, material balances can be plotted from the blast furnace gas analysis and heat balances can be derived therefrom which provide information concerning melting capacity and the quality of the pig iron. The nitrogen balance, which to the prior art is substantially determined from the amount aof blast air, which has been corrected as to its state, and the proportion of nitrogen in the blast furnace gas stands at first place here.

The carbon dioxide and carbon monoxide contents are determined in the previously used continuous analysis of the blast furnace gas with the aid of the infrared absorption measurement, the hydrogen content by means of the thermal conductivity measurement and the nitrogen content from the difference of the measured other gases to 100% volume. However, that results in the nitrogen content calculated from the difference being subjected to the errors which may arise in determining the components CO, $CO_2$ and $H_2$. For example, an incorrect measurement of the CO content of 0.25% by volume and a corresponding incorrect calculation of the nitrogen content leads to the thermal economy in the lower furnace being wrongly regulated, which results in the silicon content in the pig iron of 0.23% being changed.

Various methods are known from analytical chemistry for the analysis of nitrogen, particularly of nitrogen in bonded form, in connection with individual steel samples.

Thus, an apparatus for determining the total nitrogen of a solid sample is described in "Archiv für das Eisenhüttenwesen", 42nd year (1971), page 878. With this apparatus the sample to be analyzed is melted in a furnace and the drawn-off extraction gas containing carbon monoxide and hydrogen as well as nitrogen is analyzed as to its total content of nitrogen. For this purpose the carbon monoxide and hydrogen are removed from the extraction gas by oxidation and the nitrogen content is then determined in an analyzer for thermal conductivity. This arrangement is not suited for the continuous measurement of the nitrogen content in the blast furnace gas.

It is an object of the invention, therefore, to improve the blast furnace regulation by improving the blast furnace gas analysis, in such a way that all constituents are constantly and continuously determined to a degree of accuracy of ± 0.1% by volume. The degree of accuracy should preferably be higher.

SUMMARY OF THE INVENTION

The object of the present invention are provided in a process for regulating the operation of a blast furnace in response to analysis of the effluent blast furnace gas which process comprises continuously admixing said blast furnace gas with carrier gas, removing from the resultant admixture CO, $CO_2$ and $H_2$ and thereafter continuously feeding the remaining admixture comprising carrier gas and nitrogen into a nitrogen measuring means and measuring nitrogen therein.

As nitrogen measuring means an analyser for thermal conductivity is preferred. For the continuously removing of CO, $CO_2$ and $H_2$ chemical absorption is possible, but it is preferred to oxidize CO to $CO_2$ and $H_2$ to $H_2O$ and removing $CO_2$ and $H_2O$, especially by adsorption.

It is therefore seen that the objects of the present invention are solved in that the nitrogen content is measured continuously in an analyzer such as one which measures the thermal conductivity of the unknown gas comprising nitrogen and carrier gas from which the nitrogen content can be determined by reference to the simultaneously measured thermal conductivity of the carrier gas (i.e. a measuring by comprising to known standards).

Preferably the process is carried out in one of two parallel paths with means for alternating the switching of the flow of gas from one path to another whereby to permit the unused path to be regenerated. The water and carbon dioxide is removed by virtue of the size or shape selective adsorbant thereby removing from the gaseous admixture components which might otherwise interfere with the analysis. The nitrogen content of the sample gas can readily be determined directly. For the purpose of this invention a wide variety of carrier gases can be used. Preferably these carrier gas are inert gases especially helium and argon.

It is essential for the subject of the application to realize that the continuous measurement of the nitrogen content is an essential basis for regulating the operation of the blast furnace. The sources of error, which are unavoidable in the known supervision and regulation of the operation of the blast furnace, are firstly excluded by means of the continuous measurement of the nitrogen content in the blast furnace gas.

It has to be recognized that for the supervision and regulation of the blast furnace operation the other constituents of the blast furnace gas, i.e. CO, $CO_2$ and $H_2$, are continuously measured in a divided separate stream of the blast furnace gas in the manner known as herein described before.

A device, which is particularly suited for carrying out the continuous measurement of the nitrogen content in the blast furnace gas, is one in which at least two parallel section — each comprising an oxidation column and an adsorption column — are provided between the gas mixing chamber and nitrogen measuring means for the removal of the proportion of CO, $CO_2$ and $H_2$, said paths being alternately available for the measurement or regeneration.

Carbon monoxide and hydrogen are oxidized out of the gas mixture for expedience at about 190° C by copper oxide to carbon dioxide and water, respectively, in the oxidation column and the water vapor and carbon dioxide are absorbed at room temperature in the adsorption column to a molecular sieve with a pore diameter of 5 A., e.g., Linde molecular sieve 5A the like. Materials, which can be regenerated, are preferably used as oxidation and adsorption means.

The absolute determination of the nitrogen content according to the measurement process of the invention has the advantage over the known process according to the difference methods that the proportion of nitrogen can be measured at a considerably higher degree of accuracy with a rate of error of less than ± 0.075% by volume.

A continuous measurement of all components and high rate of accuracy of the gas analyzers is required for supervising and regulating the operation of the blast furnace automatically with the aid of a process computer. The special advantages of the subject of the invention include the ability to supervise and regulate the blast furnace with a considerably greater accuracy by the continuous absolute determination of the nitrogen content. The degree of continuous accuracy is far greater than was possible with the previously usual continuous analysis according to the difference methods.

A further advantage of the process according to the invention over the difference methods is that the working method of the gas analyzers can be continuously checked and consequently errors can be easily ascertained.

BRIEF DESCRIPTION OF THE DRAWING

The attached FIGURE shows a schematic representation of the device for continuously measuring the nitrogen content in the blast furnace gas.

DESCRIPTION OF SPECIFIC EMBODIMENT

Referring to the drawing, the blast furnace gas is conveyed through the feed pipe 1 and the change-over cocks 2 and 3 to a measurement gas cooler 4 in which the water still present in the blast furnace gas is extracted by cooling to +4° C. The blast furnace gas is then continuously mixed in a gas mixing pump 5 at a constant ratio with the carrier gas helium, which is conveyed through the feed pipe 1a. Both gases are conveyed from the gas mixing pump 5 at the same and lowest possible pressure through the flow regulators 6 and 7, respectively, which balance fluctuations in pressure on the inlet side of the gas mixing pump 5 to a great extent in order to obtain a constant mixing ratio with the least possible rate of error. The gas mixture leaving the gas mixing pump 5 enters the mixing chamber 8 in which the gas mixture is homogenized. A portion of the mixture of blast furnace gas and carrier gas is then sucked off from the mixing chamber 8, the excess of gas mixture thereby escaping into the open air. The sucked off portion of the mixture of blast furnace gas and carrier gas is subsequently conveyed through the change-over cock 9 or 9', the path 10 or 10' and the change-over cock 13 or 13' to the analyzer for thermal conductivity 14.

The stretch 10 or 10' comprises an oxidation column 11 or 11' and an adsorption column 12 or 12' arranged in series thereto. The carbon monoxide and hydrogen of the mixture of the blast furnace gas and carrier gas are oxidized to carbon dioxide and water, respectively, at a temperature of about 190° C in the oxidation column 11 or 11', which is filled with a copper oxide as a catalyst containing effective substance. The gas mixture, which now consists of the carrier gas helium, nitrogen, carbon dioxide and water vapour, enters the adsorption column 12 or 12', which is filled with a molecular sieve having a pore diameter of 5A. The carbon dioxide and water vapour are adsorbed here at room temperature.

The remaining gas mixture comprising nitrogen and the carrier gas helium then passes through the change-over cock 13 or 13' and is conveyed to the analyzer 14 of the thermal conductivity detector, in which the nitrogen content is measured. The carrier gas helium passes the comparative gas path of the analyzer 14 through the flow regulator 15. The measurements can be directly conveyed to a digital measuring instrument 21 or a process computer (not shown) over an amplifier 16 which is connected to the thermal conductivity detector.

The calibration of the measuring device is achieved with the aid of binary gas mixtures with a specific nitrogen content. Calibrating gases in place of the blast furnace gas are introduced thereto for a short time through the change-over cock 2 or 3 at certain intervals. As a straight line is received as instrument characteristics, it is sufficient only to work with two different calibrating gas mixtures. For the mixture which is conveyed through the change-over cock 2 the proportion of nitrogen is selected corresponding to a measurement point slightly above the beginning of the measurement area. The other mixture, which is conveyed through the change-over cock 3, corresponds to a measurement point slightly below the end of the measurement area. The nitrogen analyzer according to the invention for measuring the proportion of nitrogen in the blast furnace gas is thus designed for the measurement area of 45.0 to 60.0% nitrogen by volume.

The oxidation column 11 and adsorption column 12 or 11' and 12' become spent after the long term effect of the mixture of blast furnace gas and carrier gas and have to be regenerated. Therefore, two pairs of columns with the same dimensions and amounts of filler are essential for apparatus to work in continuous operation.

Let us assume that the columns 11 and 12 have just taken up operation, i.e., the mixture of blast furnace gas and carrier gas is conveyed out of the mixing chamber 8 through the change-over cock 9, the section 10 and the change-over cock 13 to the analyzer for thermal conductivity 14 for the removal of the proportion of CO, $CO_2$ and $H_2$ from the blast furnace gas and for the measurement of the nitrogen content. The regeneration of column 11' and 12' proceeds at the same time.

As a first step air is conducted thereto through the feed pipe 17 and the change-over cocks 18, 19 and 9' by the pair of columns 11' and 12'. The transformation of the copper back into copper oxide is carried out in the oxidation column 11' at a temperature of about 190° C. The adsorption column 12' is heated during this first phase of the regeneration from room temperature to about 280° C, in order to desorb carbon dioxide and water. The reaction products thereby escape through the change-over cock 13' and pipe 20 into the open air.

In the second phase of the regeneration, the carrier gas helium flows through the change-over cocks 18, 19 and 9' through the section 10' and is also drawn off by the change-over cock 13' and the pipe 20. During this time the heating of the adsorption column 12' ends and the column 12' is cooled down to room temperature.

In the third phase of the regeneration through the change-over cocks 19 and 9' after this rinsing (scavenging with helium a portion of the mixture of blast furnace gas and carrier gas is now also conducted through the columns 11', 12'.

At this time is quality and quantity the same mixture of blast furnace gas and carrier gas therefore flows through the pair of columns 11', 12' as through the pair of columns 11, 12. The regenerated columns 11', 12' are therefore rinsed before changing over with the gas to be measured. In this way the nitrogen can be determined without interruption and without the measurement value of the nitrogen being suddenly disturbed.

Helium is preferably used as carrier gas. Taking the usual dimensions for measurement apparatus into consideration, and also especially the measurement sensitivity of the thermal conductivity detector, the ratio in the mixture of carrier gas to blast furnace gas is preferably selected in such a way that the proportion of carrier gas equals more than 50% by volume of said blast furnace gas and said carrier gas. A proportion of carrier gas of over 70% up to 98% by volume, e.g., 93% helium by volume and 7% blast furnace gas by volume, has proven in practice to be particularly expedient. It has been shown in practice that this high proportion of carrier gas produces, in conjunction with the functioning of the columns, very good results in a short time. This continuous quick analysis is an essential condition for the supervision and regulation of the blast furnace operation. On the other hand, if the proportion of blast furnace gas out-balances this, disturbances may arise due to, for example, the loading capacity of the columns being exceeded.

The gas mixing pump 5 used makes possible the constant of the mixture composed of carrier gas and blast furnace gas which is important for the accuracy and reproducibility of the measurement. Argon can also be used as carrier gas. In this case the measured values of nitrogen are to be corrected with a factor which takes into consideration the proportion of argon contained in the blast furnace gas.

It has to be recognized that the method of continuously analysing the $N_2$ can be carried out for a long time, i.e. for several hours, but that in relation to this long period it is not harmful to the continuous supervision and regulation of the blast furnace operation if — for a short time — the $N_2$ analysis is interrupted. During this interruption it is possible to change the CO, $CO_2$ and $H_2$ removing zone for example by hand if no parallel regenerated path is available. On the other hand it is advisable to interrupt the continuous measurement from time to time in order to calibrate the measuring device by feeding known calibrating mixtures there-through.

What is claimed is:

1. In a process for continuously regulating the operation of a blast furnace in response to analysis of the effluent blast furnace gas containing CO, $CO_2$, $N_2$ and $H_2$ the improvement which comprises continuously admixing said blast furnace gas with a carrier gas, removing from the resultant admixture CO, $CO_2$ and $H_2$ and thereafter continuously feeding the remaining admixture comprising said carrier gas and said $N_2$ into a nitrogen measuring means.

2. A process according to claim 1 wherein said removing of said CO, $CO_2$ and $H_2$ comprises an oxidation zone maintained under CO and $H_2$ oxidizing conditions whereby to oxidize CO in said gas to $CO_2$ and, $H_2$ to $H_2O$, passing the gas from said oxidation zone to a $CO_2$ and $H_2O$ removing zone which allows said carrier gas and said $N_2$ to pass therethrough and thereafter continuously feeding the remaining admixture comprising said carrier gas and said $N_2$ into said nitrogen measuring means.

3. A process according to claim 2 wherein said $CO_2$ and $H_2O$ removing zone comprises an adsorption zone.

4. A process according to claim 2 wherein a first oxidation zone is provided in series with a first $CO_2$ and $H_2O$ removing zone, said first oxidation zone and said first $CO_2$ and $H_2O$ removing zone are in parallel to a second oxidation zone in series with a second $CO_2$ and $H_2O$ removing zone, said blast furnace gas is fed continuously to one set of oxidation and $CO_2$ and $H_2O$ removing zones while the contents of the other set of oxidation $CO_2$ and $H_2O$ removing zones is regenerated and following regeneration said blast furnace gas is fed to said second set of oxidation and $CO_2$ and $H_2O$ zones and thence to said nitrogen measuring means while the contents of said first set of oxidation and $CO_2$ and $H_2O$ zones are regenerated.

5. A process according to claim 4 wherein said first and said second $CO_2$ and $H_2O$ removing zones each an adsorption zone.

6. A process according to claim 2 wherein said oxidation zone contains an oxidation catalyst.

7. A process according to claim 1 wherein said carrier gas is an inert gas.

8. A process according to claim 7 wherein said carrier gas is helium.

9. A process according to claim 7 wherein said carrier gas is argon.

10. A process according to claim 3 wherein said adsorbent is a 5 A molecular sieve.

11. A process according to claim 1 wherein said carrier gas is mixed with said blast furnace gas such that the resultant admixture contains more than 50% by volume carrier gas.

12. A process according to claim 11 wherein said carrier gas amounts to 70 to 98% by volume of the gas admixture.

13. A process according to claim 11 wherein said carrier gas is mixed at a constant ratio with said blast furnace gas.

14. A process according to claim 5 wherein following regeneration of the oxidation and adsorption zones of one set of oxidation-adsorption zones prior to feed of the full component blast furnace gas therethrough, the nitrogen content of which is to be measured, a portion of said blast furnace gas in admixture with said carrier gas is passed therethrough.

15. A process according to claim 14 wherein while a portion of said blast furnace gas is being fed through the regenerated oxidation and adsorption zones, blast furnace gas is being fed through the other set of oxidation and adsorption zones.

16. A process according to claim 1 wherein said nitrogen measuring means is a thermal conductivity analyzer whereby the nitrogen content is determined by measuring the thermal conductivity of the gas and comparing the same to known standards.

17. A process according to claim 5 wherein regeneration is effected by feeding air at an elevated temperature through said oxidation zone and adsorption zone, thereafter feeding helium therethrough thereby cooling said zones down to room temperature and thereafter rinsing said zones by passing said blast furnace gas in admixture with said carrier gas therethrough.

18. A process according to claim 1 wherein said continuous analysis of said effluent blast furnace gas is stopped for a short time in order to calibrate the measuring means by feeding calibrating gases therethrough.

19. A process according to claim 4 wherein there is at least one additional set of oxidation and $CO_2$ and $H_2O$ removing zones in series with one another between said blast furnace and admixing with said carrier gas and said nitrogen measuring means and in parallel with said first and second set of oxidation and removing zones and periodically blast furnace gas in admixture with said carrier gas is fed therethrough while the contents of said first and/or second set of oxidation removing zones are regenerated.

20. A process according to claim 1 wherein for said continuously regulating of said blast furnace operation said analysis of said effluent blast furnace gas comprises said nitrogen analysis and separate therefrom the continuous analysis of CO, $CO_2$ and $H_2$.

21. An apparatus for directly measuring the amount of nitrogen in a blast furnace gas which comprises between a gas mixing apparatus and a nitrogen measuring means a first oxidation reactor containing an oxidation catalyst in series fluid communication with a first absorption reactor containing a size or shape selective absorbent which absorbs both $CO_2$ and water, a second oxidation reactor containing an oxidation catalyst in series fluid communication with a second adsorption reactor containing a size or shape selective adsorbent which adsorbs both $CO_2$ and water, said first oxidation and adsorption reactors being in parallel with said second oxidation and adsorption reactors, all of said reactors being in fluid communication up stream of said oxidation reactors with said gas mixing apparatus and downstream of said adsorption reactors with said nitrogen measuring means, and a feed of blast furnace gas admixed with carrier gas means for alternating the feed of said admixed gas to either said first oxidation and adsorption reactors or said second oxidation and adsorption reactors while passing the effluent therefrom to said nitrogen measuring means.

22. An apparatus according to claim 21 further comprising means for regenerating an oxidation and adsorption reactor of one of the sets of oxidation-adsorption reactors while blast furnace gas is fed through the set thereof.

23. An apparatus according to claim 21 wherein said nitrogen measuring means is a thermal conductivity analyzer.

24. An apparatus according to claim 21 wherein between said gas mixing apparatus and said nitrogen measuring means there is at least one additional set comprising oxidation reactor in series fluid communication with said adsorption reactor.

* * * * *